June 27, 1944. H. E. HEIGIS Re. 22,507

CYLINDER RACK

Original Filed July 16, 1940 2 Sheets-Sheet 1

Inventor

Henry Ernest Heigis

By

Ernest A. Joerren

Attorney

June 27, 1944. H. E. HEIGIS Re. 22,507

CYLINDER RACK

Original Filed July 16, 1940 2 Sheets-Sheet 2

Inventor

Henry Ernest Heigis

By

Ernest A. Joerren

Attorney

Reissued June 27, 1944 Re. 22,507

UNITED STATES PATENT OFFICE 22,507

CYLINDER RACK

Henry Ernest Heigis, Nutley, N. J., assignor to Specialties Development Corporation, Bloomfield, N. J., a corporation of New Jersey Original No. 2,288,622, dated July 7, 1942, Serial No. 345,710, July 16, 1940. Application for reissue June 17, 1943, Serial No. 491,194

11 Claims. (Cl. 211—75)

This invention relates to racks, and more particularly to racks for the lateral support of cylindrical objects such as metal cylinders or containers, generally used for storing fluid media under high pressure.

The use of metal cylinders or containers, especially for the storage of liquid carbon dioxide for fire extinguishing purposes, is widely practiced and the need for a convenient method of supporting these cylinders or containers has been felt for some time. The prime requisite, for such a supporting rack is extreme adaptability or flexibility, since the cylinders have to be placed in a great variety of arrangements and, if possible, each cylinder should be easily and separately removable from the group as a whole, in order to facilitate servicing and the initial erection.

It is accordingly an object of this invention to provide a supporting rack for use with a group of cylindrical containers which permits easy manipulation of each individual container without the necessity for disturbing other containers of the group.

It is another object of the present invention to provide a rack, as stated above, which comprises a plurality of separate link-like members easily assembled to form with the containers a rigid and unitary structure.

These and other objects will become apparent from the description of an embodiment of the invention as illustrated in the accompanying drawings, wherein:

Figure 2 is a view in end elevation of a number of rows of cylinders supported by two rack assemblies, while

Figure 1:
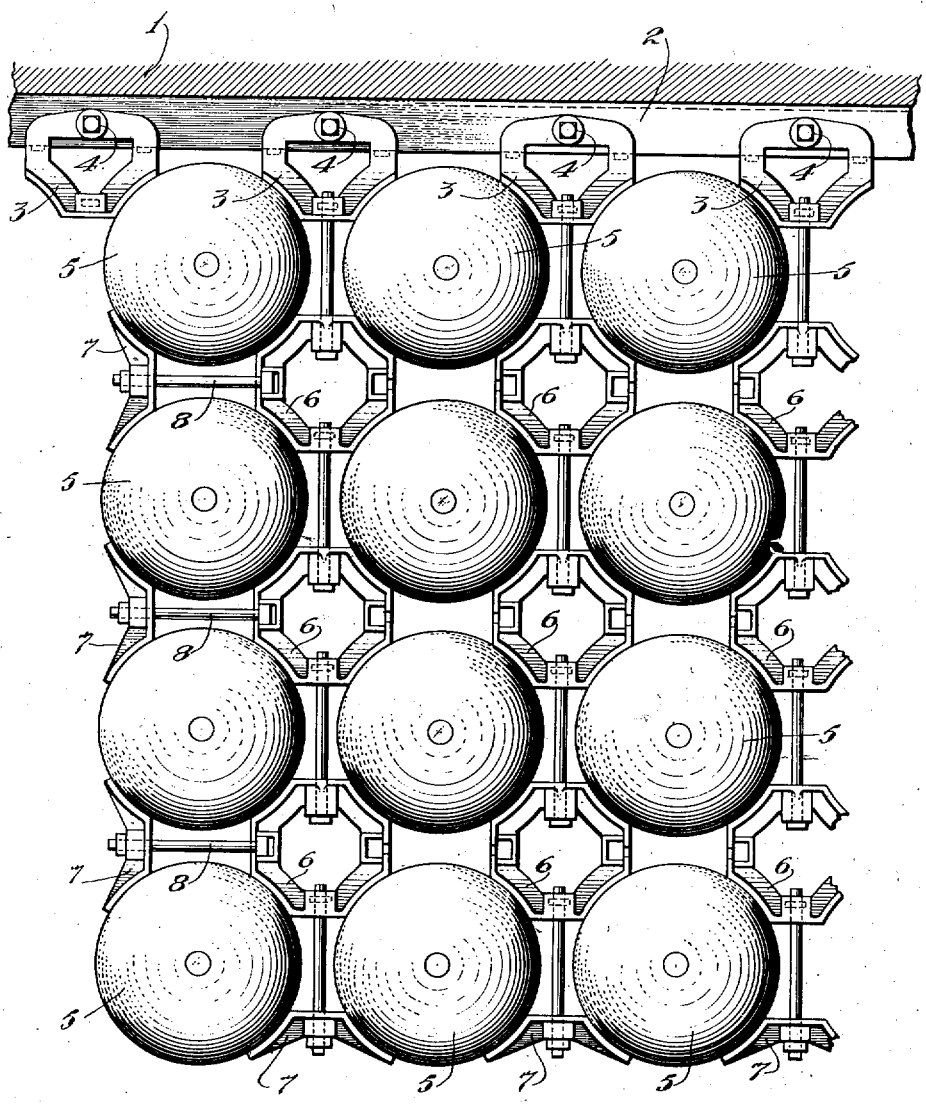
Figure 1 represents a top plan view of a typical rack and cylinder assembly in accordance with the present invention.

Referring to the drawings in detail, where similar reference characters indicate corresponding parts, 1 represents the supporting wall in section; 2 a base or bracket member which is shown in this case to comprise an angle piece fastened to the wall; 3 the back chocks, each formed to provide a frontal support for two cylinders; 4 the bolts by which said back chocks are secured to the bracket member; 5 the cylinders supported by the rack; 6 the spacer chocks adapted to be placed in the space formed between four cylinders and adapted to provide lateral supports for these cylinders where they make contact with the spacer chock; 7 the end clamps which are each formed to give lateral outside support to two cylinders; and 8 the bolts by which the back chocks, spacer chocks and end clamps are interconnected.

Figure 3:
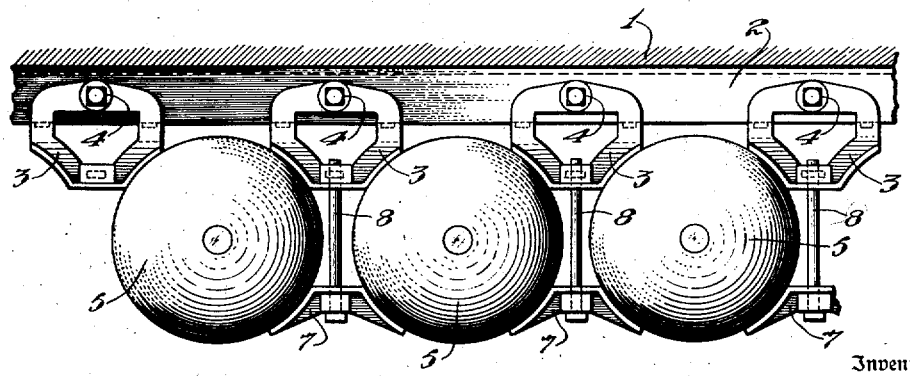
Figure 3 is a plan view of a single row cylinder rack.

In practice, when a number of rows of cylinders are to be placed in position, the bracket or base member 2 is fastened to the supporting wall 1 and a back chock or retaining means 3 is bolted to the bracket or base member 2 one for each two rows of cylinders formed at a right angle to the wall. The first row of cylinders parallel to the wall is then arranged alongside the back chocks, and retainers or spacer chocks 6 are bolted to the back chocks. It is seen from inspection of the drawings that there is such a spacer chock for each space formed between four cylinders, so that, when the bolts are in place, each cylinder by virtue of the configuration of the back and spacer chocks which conform to the shape of the cylinders, is securely held in place. On the side and at the front of the whole group, end retaining means or clamps 7, bolted to the spacer chocks, as seen in Figure 1, and to the back chocks as in Figure 3, serve to retain the cylinders on the outside of the group. Thus, cylinders comprising a single row or more, up to any desired number of rows and in any desired arrangement, may be speedily and securely assembled.

Another inherent advantage is that it is possible, for instance, in the case of a one-row group, (Figure 3) to weigh an individual cylinder in place by merely loosening two bolts and then swinging the end clamp to a vertical position. This is of great importance in connection with carbon dioxide containers which have to be weighed periodically. The number of cylinders in the group, too, may be varied subsequently simply by adding or taking away the corresponding number of rack elements. It is thus seen that an exceptionally flexible and adaptable type of rack has been provided, in accordance with the objects set forth.

Figure 2:
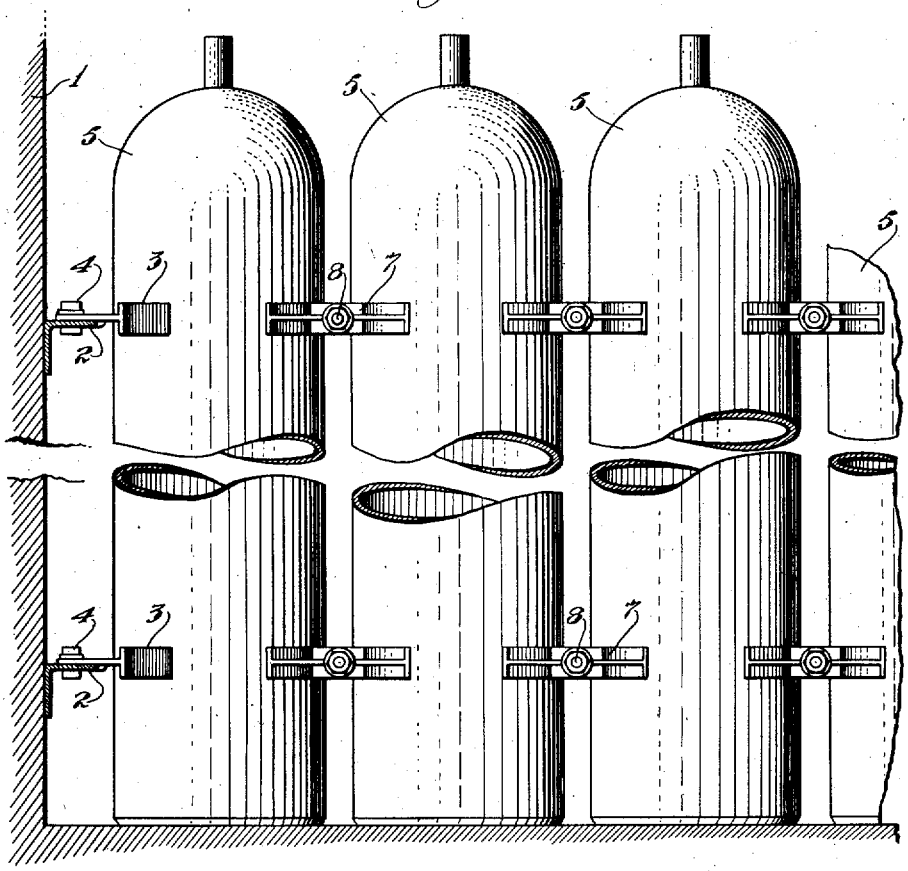

Depending on the height of the cylinders the use of a top and bottom rack is indicated, as shown in Figure 2. The individual parts of the rack may be made of any material, preferably metal, capable of withstanding the stresses encountered.

While the invention has been described in connection with the details of construction shown in the accompanying drawings, it will be apparent to those skilled in the art that the invention can be embodied in other forms of construction without departure from the scope of the invention, and for this reason I do not wish to be strictly limited to the disclosure but rather to the scope of the appended claims.

I claim:

1. A rack assembly for the support of a group of upright cylindrical objects arranged in rows of width and depth, comprising a base member; back chocks secured to said base member, each two of which together are adapted to form retaining means for each of the objects adjacent said base member, a spacer chock disposed in each space formed by four of the objects; an end clamping member disposed on the outside of the group between each two end objects; and connecting links removably tying said end clamping members to the nearest spacer chocks and all members of the assembly in depth.

2. In a rack assembly for the support of a group of upright cylinders arranged in rows of width and depth, having a base member; a plurality of back chocks adapted to be secured to said base member each formed with two sides adapted to accommodate the lateral thrust of the two cylinders adjacent said back chock, and spacer chocks each formed with four sides adapted to accommodate the lateral thrust of the four cylinders surrounding it, and connecting links between each back chock and the nearest spacer chock, whereby each cylinder except the last ones in the row parallel to and adjacent to said base member is supported by the cooperation of four thrust taking sides, one each on the two back chocks and the two spacer chocks adjacent the cylinder.

3. In a rack assembly for the support of a group of upright cylinders arranged in rows of width and depth, having a base member, back chocks, spacer chocks, and end clamps: the combination for the support of the cylinder adjacent said base member in the outside row, of two back chocks, a spacer chock and an end clamp, and connecting links between said spacer chock and one of said back chocks and said end clamp.

4. In a rack assembly for the support of a group of upright cylinders arranged in rows of width and depth, having a base member, spacer chocks and end clamps: the combination for the support of each cylinder in the outside width and depth rows except the corner cylinders, of two spacer chocks, two end clamps; and connecting links between said end clamps and said spacer chocks and a connecting link between the spacer chocks.

5. A rack assembly for the support of a group of upright cylindrical objects arranged in rows of width and depth, comprising a base member; retaining means detachably secured to said base member for accommodating the objects adjacent said base member; spacer means between adjacent width rows providing retainers for the objects in the adjacent width rows; connecting links removably tying said retaining means to said spacer means; end retaining means at the outside width row for accommodating the objects in the outside width row; and connecting links removably tying said last mentioned retaining means to said spacer means.

6. A rack assembly for the support of a group of upright cylindrical objects arranged in rows of width and depth, comprising a base member; retaining means detachably secured to said base member for accommodating the objects adjacent said base member; spacer means between adjacent width rows providing retainers for the objects in the adjacent width rows; connecting links removably tying said retaining means to said spacer means; connecting links removably tying adjacent spacer means in depth; end retaining means at the outside width row for accommodating the objects in the outside width row; and connecting links removably tying said last mentioned retaining means to said spacer means.

7. A rack assembly for the support of a group of cylindrical objects arranged in rows of width and depth, comprising retaining means adapted to be detachably secured to a base for accommodating the objects adjacent the base; spacer means between adjacent width rows providing retainers for the objects in the adjacent width rows; connecting means removably tying said retaining means to said spacer means; and retaining means at the outside width row for accommodating the objects in the outside width row; and connecting means removably tying said last mentioned retaining means to said spacer means.

8. A rack assembly for the support of a group of cylindrical objects arranged in rows of width and depth, comprising retaining means adapted to be detachably secured to a base for accommodating the objects adjacent the base; spacer means between adjacent width rows providing retainers for the objects in the adjacent width rows; connecting means removably tying said retaining means to said spacer means; connecting means removably tying adjacent spacer means in depth; end retaining means at the outside width row for accommodating the objects in the outside width row; and connecting means removably tying said last mentioned retaining means to said spacer means.

9. A rack assembly for the support of a group of cylindrical objects arranged in at least one row, comprising a plurality of retaining means adapted to be detachably secured to a base for accommodating one side of a row of the objects, a plurality of end retaining means for accommodating an opposite side of a row of the objects, each of said first retaining means being substantially in line with one of said second retaining means, and connecting means removably tying said respective first and second retaining means in line with each other.

10. A rack assembly for the support of a group of upright cylindrical objects arranged in at least one row, comprising a base, a plurality of separate retaining means detachably secured to said base for accommodating one side of a row of the objects, a plurality of separate end retaining means for accommodating an opposite side of a row of the objects, each of said first retaining means being substantially in line with one of said second retaining means, and connecting means removably tying said respective first and second retaining means in line with each other.

11. The combination of supporting means and a rack assembly for the support of a group of objects arranged in substantially parallel rows; said assembly comprising spacer means adapted to be disposed in the spaces between four adjacent rectangularly arranged objects, and retainer means for engaging the outermost objects of the group and connected to said spacer means independently of said supporting means; said retainer means coacting with said spacer means to clamp the objects in fixed spaced and row relation, said spacer means being connected to said supporting means whereby the objects are maintained in fixed relation with said supporting means.

HENRY ERNEST HEIGIS.